Sept. 5, 1944. M. H. MARTIN 2,357,530
TRUCK
Filed Dec. 17, 1942 2 Sheets-Sheet 2
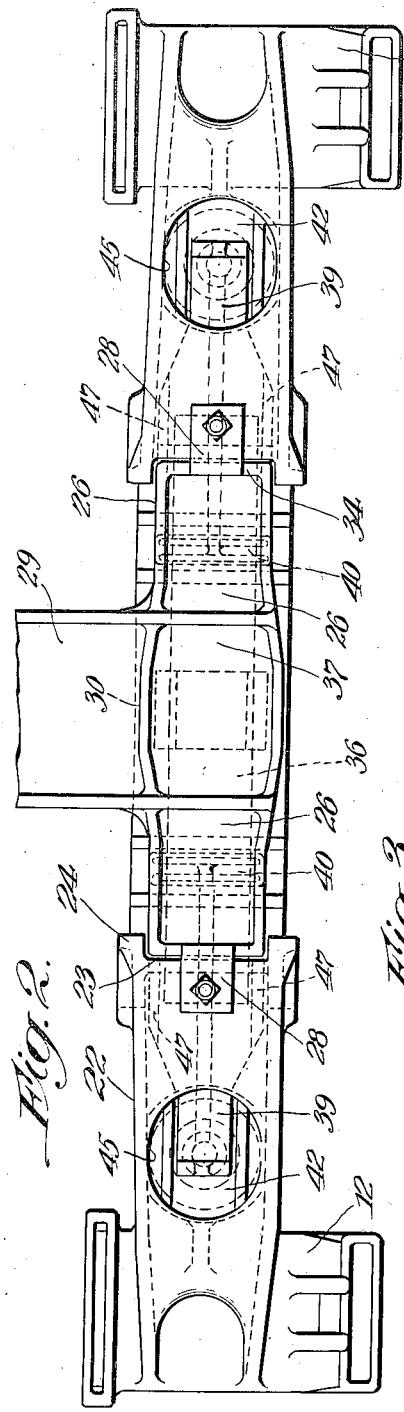
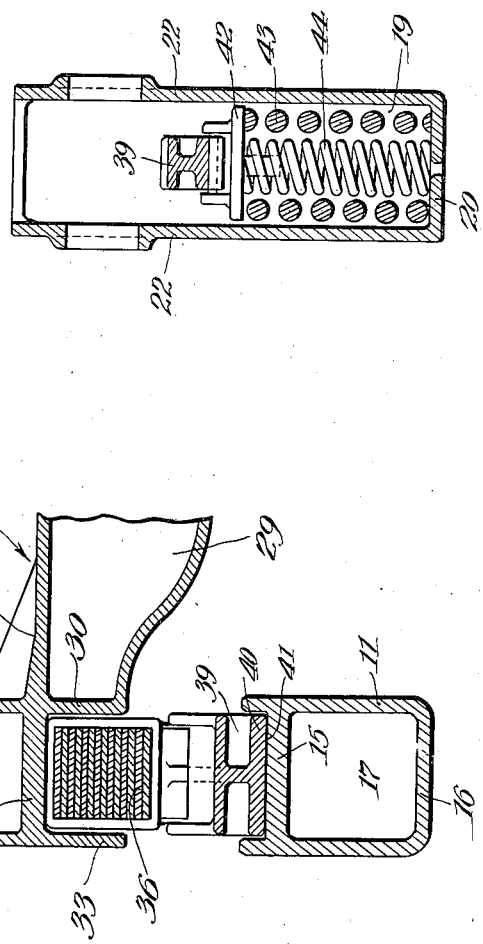

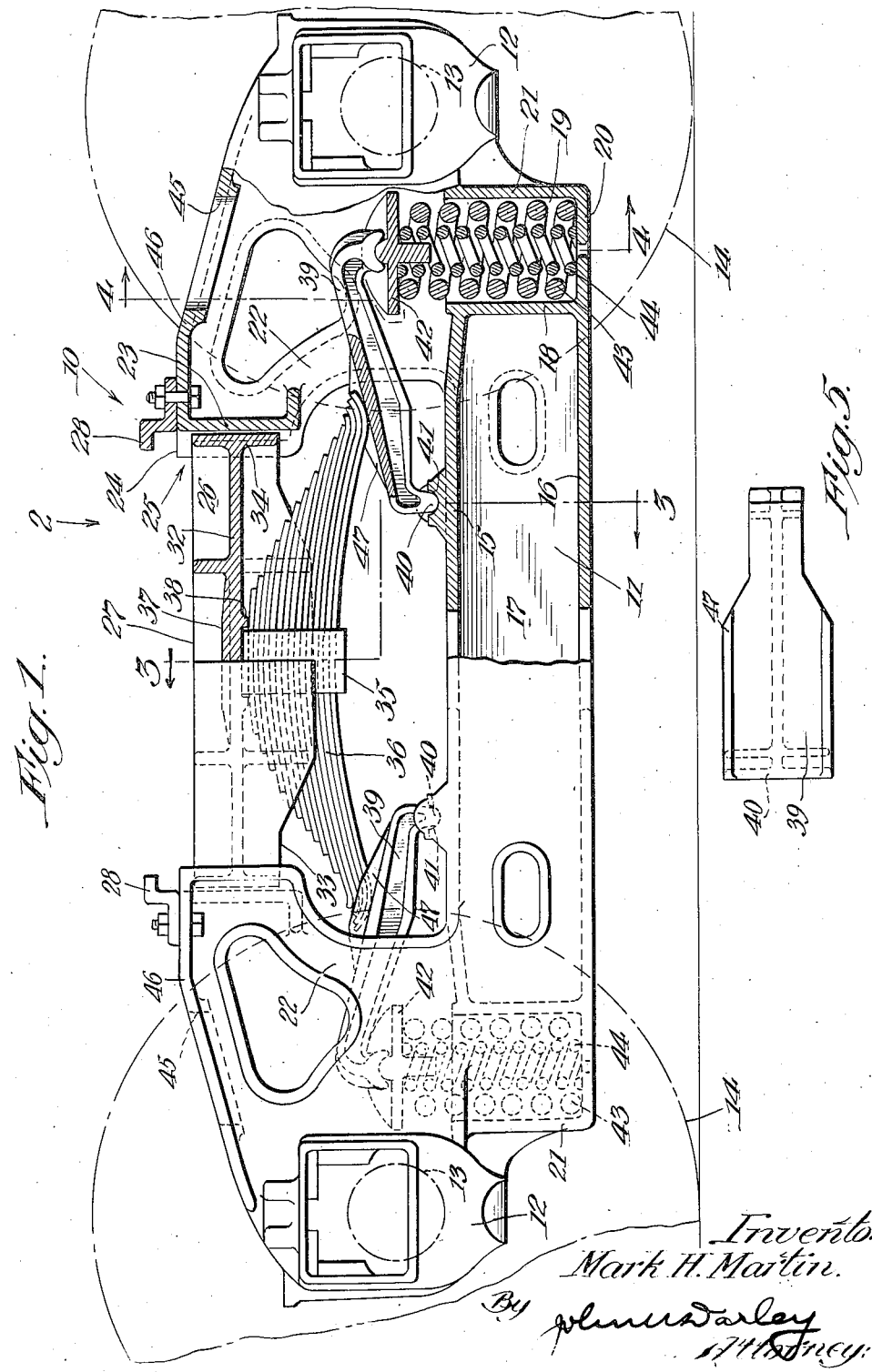

Patented Sept. 5, 1944

2,357,530

UNITED STATES PATENT OFFICE 2,357,530

TRUCK

Mark H. Martin, Reading, Pa., assignor to Birdsboro Steel Foundry and Machine Company, Birdsboro, Pa., a corporation of Pennsylvania Application December 17, 1942, Serial No. 469,334

23 Claims. (Cl. 105—197.1)

My invention relates to railway car trucks of the freight car type and, in particular, a truck characterized by good riding qualities and capacity for high speed service.

The riding action of freight car trucks has been improved by the adoption of spring groupings of different types of springs, such as coil or freely acting springs, and energy absorptive springs, such as plate or leaf springs, which have a mutually dampening action when subjected to a common load. This spring arrangement reduces the tendency towards synchronous vibration which in the case of an all coil spring suspension may be set up by track or wheel irregularities. In this design, however, the vertical travel of the truck bolster is still equal to the total deflection of the spring assembly and in an endeavor to reduce the extent of this movement and so further improve the riding qualities of the truck, it has heretofore been proposed to utilize levers between the leaf and coil springs. By proportioning the arms of the levers, it is possible to make the bolster movement less than the spring deflection at any moment and in any desired ratio.

My improved truck is of the foregoing type and one object of the invention is to include in the spring suspension long travel coil springs which absorb the wheel shocks due to rail joints and rough track, and also to provide a stabilized support for these springs.

A further object is to provide a truck in which the springs and levers are arranged and related to the truck bolster and side frames so as to insure a stable cooperation and controlled movement of these parts.

A further object is to provide a truck in which the bolster load is transmitted to the side frames in locations other than the central portion of each frame, thereby permitting the frame to be made with simple shapes and sections, a more economical distribution of metal, and a corresponding reduction in weight.

A further object is to provide a truck of the character indicated wherein the bolster engages the side frame guides at points closer to the journal boxes than in a truck having a truss side frame provided with a window opening to thereby more effectively maintain the desired working relation of the bolster and side frames and the "squareness" of the truck and so reduce wear on the rails and the wheel flanges.

A further object is the provision of a car truck employing the aforesaid devices for reducing bolster movement relative to spring deflection wherein the transmission of the load from the bolster to the side frames is in a generally downward direction, as distinguished from those designs in which the transmission direction is partially upwards and so necessitates the use of hangers or comparable arrangements which are eliminated by my structure.

A further object is to devise a car truck having side frames of the beam type equipped with coil and work absorptive springs arranged in series, load transfer relation.

These and further objects of my invention will be set forth in the following specification, reference being had to the accompanying drawings, and the novel means by which said objects are effectuated will be definitely pointed out in the claims.

In the drawings:

Fig. 1 is a side elevation of my improved truck, partly in section.

Fig. 2 is a plan view of one side frame and the cooperating end of the truck bolster as viewed in the direction of the arrow 2 in Fig. 1.

Figs. 3 and 4 are sections along the lines 3—3 and 4—4 in Fig. 1, respectively.

Fig. 5 is a plan view of one of the levers.

Referring to the drawings, the numeral 10 designates a beam type, side frame having an intermediate, depressed box section 11 and journal boxes 12 having conventional brasses and wedges (not shown) at the ends of the frame for the reception of the usual journals 13 having wheels 14 secured thereto.

The box section 11 is defined by an upper or compression web 15, a lower or tension web 16 and connecting side walls 17 and the ends of the section are closed by vertical walls 18. Each wall 18 forms one side of a spring pocket 19 having a base 20 that is a continuation of the tension web 16, side walls that are continuations of the side walls 17 and a vertical wall 21 that merges into the frame adjacent a journal box 12.

The side walls 17 are continued upwardly at the ends of the box section 11 and inwardly towards the vertical center line of the frame as at 22 and are connected at their inner, upper ends by a web 23. The walls 22 continue beyond the web 23 to form guide flanges 24 and these flanges and the webs 23 define a pair of bolster guides 25 for slidably receiving wings 26 that project laterally from the end of a truck bolster 27 and lie in the same vertical plane which includes the side frame. The bolster 27 may be intermediately formed in the customary manner for cooperation with a body bolster or other part of the car body. Endwise movement of the bolster is prevented by the flanges 24 while lugs 28, secured to the side frame at the upper ends of the webs 23 and extending toward the bolster, limit upward movement of the bolster and prevent separation from the side frames in the event of derailment.

Between the side frames, the bolster 27 may also be of box section, as indicated by the numeral 29 in Fig. 3, and this section is terminated at each end by a vertical wall 30 which is continued in opposite directions from the section to form the inner side walls of the wings 26. The upper web 31 of the bolster is continued beyond the wall 30 as a web 32 from whose outer end depends an apron 33 and the web 32 and apron 33 also extend laterally to constitute the upper web and outer wall of the wings 26. The ends of the web 32 and walls 30 and 33 are connected by a vertical wall 34 which is guidable by the webs 23. From the foregoing, it will be understood that each end of the bolster is of open bottom construction for the purpose of receiving one element of a non-synchronous spring assembly comprising coil and work absorptive or leaf spring which support the bolster on the side frame.

To this end, the central spring band 35 of a semi-elliptic spring 36 bears against the central portion of the web 32 which may be appropriately thickened as at 37. The spring 36 extends lengthwise of the wings 26 and hence of the side frame and endwise movement thereof is prevented by lugs 38 on the under side of the web portion 37 which engage the ends of the band 35, while sidewise movement is limited by the wall 30 and apron 33. The ends of the spring 36 bear on levers 39 which are resiliently and non-resiliently supported on the side frame. The inner end of each lever is provided with a nose 40 which is rockably mounted in a socket 41 as a fulcrum on the compression web 15, while the opposite end extends between the side frame walls 22 and bears against a cap 42 resting on the upper ends of concentric coil springs 43 and 44 which are seated in the pocket 19. Insertion and removal of the coil springs may be effected through openings 45 in a web 46 which connects the upper ends of the walls 22 and merges into the journal boxes. Sidewise movements of the levers relative to the associated ends of the leaf spring 36 is prevented by extending fins 47 from the upper sides of each lever which embrace the end of the leaf spring.

Under operating conditions, the springs 36, 43 and 44 act in unison and in series, load transfer relation to transmit loads to the side frame. Owing to the work absorptive nature of the spring 36, its natural period of vibration is different from the coil springs 43 and 44 so a mutual dampening action is set up which inhibits any tendency towards synchronous vibration. In addition, these springs are arranged to provide softer cushioning action under light loads while incorporating the necessary stiffness and capacity for heavier loads.

In transferring loads to the levers 39, the spring 36 acts as a resilient, equalizing lever thus insuring that one-half of the bolster load is transmitted to each lever and each lever then transmits a portion of its load directly to the compression web 15 and the remainder to the springs 43 and 44. The ratio between these lever divisions of the load depends upon the location of the end of the leaf spring relative to the lever and this point of application of the load may be varied to suit the service conditions. Only a portion of the deflection of the coil springs is transmitted through the leaf spring to the bolster 27 thus further reducing the extent of its vertical travel, compared to a construction in which the full spring deflection is transmitted to the bolster, and so improving the character of the ride. It is therefore possible to utilize coil springs which have a long travel relative to those employed in a standard all coil spring suspension and which are characterized by a relatively small deflection under varying blows and shocks so that the springs are capable of absorbing shocks to a considerable degree with a consequent reduction in their effect on the truck and car body. Preferably, the springs 43 and 44 extend above the upper end of the pocket 19 a distance sufficient to insure a contact of the cap 42 with the upper ends of the pocket walls before the springs go solid so that a resilient support for the bolster in this event will be provided by the leaf spring 36. Further, the pockets 19 are sufficiently deep to provide a stabilized support for the coil springs to thereby insure a correct positioning of these springs at all times.

The distribution of the springs provides for a stable cooperation of the bolster and side frame and avoids areas of critical loading on these parts and hence enables the use of simple structural shapes and sections with corresponding lightness of weight. In this connection, it will be noted that the coil springs are located close to the journal boxes while the lever fulcrums are positioned a substantial distance from the vertical center line of the side frame. An important feature of the invention resides in the transmission path of the bolster load. Referring to Fig. 1, it will be seen that this path is generally downward from the bolster to the side frame and this arrangement possesses a distinct advantage over prior structures of the same general type wherein it has been found necessary to reverse the direction of the load distribution before finally reaching the side frame. Such constructions require hangers or similar devices to transfer the load from the levers to the coil springs and hence increase the complexity of the assembly.

The relatively wide spacing of the bolster guides and the corresponding shaping of the ends of the bolster is an important feature of the invention. This construction, as compared to the usual arrangement in which the end of the bolster extends through the window opening of a truss type of side frame, provides a better working relation and relative control of the bolster and side frame, particularly in the matter of maintaining the "squareness" of the truck which is an important factor as regards reducing rail and flange wear.

All of the foregoing features have been combined in a truck which is characterized by good riding qualities, adaptation for high speed service, and capacity for easy assembly and replacement of the several parts of the truck.

I claim:

1. In a truck, the combination of a side frame and a bolster operatively related thereto, and means for supporting the bolster comprising, load transmitting coil springs seated on the frame adjacent the ends thereof, levers each having one end fulcrumed on the frame and the other end bearing directly on and disposed above a coil spring, and a work absorptive spring interposed between the bolster and intermediate points on the levers and arranged to act as an equalizing lever member in transmitting the bolster load to the levers.

2. In a truck, the combination of a side frame and a bolster operatively related thereto, and means for supporting the bolster comprising coil springs seated on the frame adjacent the ends thereof, levers each having one end fulcrumed on the frame and the other end bearing directly on and disposed above a coil spring, and a work absorptive spring interposed between the bolster and intermediate points on the levers and positioned at a height above the coil springs, the work absorptive spring being arranged to act as an equalizing lever member in transmitting the bolster load to the levers.

3. In a truck, the combination of a side frame having spring pockets adjacent the ends thereof, a bolster operatively related to the frame, and means for supporting the bolster on the frame comprising load transmitting, coil springs seated in the pockets, levers each having one end fulcrumed on the frame and the other end bearing directly on and disposed above a coil spring, and a work absorptive spring interposed between the bolster and intermediate points on the levers and arranged to act as an equalizing lever member in transmitting the bolster load to the levers.

4. In a truck, the combination of a side frame and a bolster operatively related thereto, and means for supporting the bolster comprising load transmitting coil springs seated on the frame adjacent the ends thereof, levers each having an inner end fulcrumed on the frame and an outer end bearing directly on and disposed above a coil spring, and a leaf spring interposed between the bolster and intermediate points on the levers.

5. In a truck, the combination of a side frame and a bolster operatively related thereto, and means for supporting the bolster comprising coil springs seated on the frame adjacent the ends thereof, levers each having an inner end fulcrumed on the frame and an outer end bearing directly on and disposed above a coil spring, and a leaf spring interposed between the bolster and intermediate points on the levers and positioned at a higher elevation than the coil springs.

6. In a truck, the combination of a side frame and a bolster operatively related thereto, and means for supporting the bolster comprising load transmitting, coil springs seated on the frame adjacent the ends thereof, levers each having an inner end fulcrumed on the frame and an outer end bearing directly on and disposed above a coil spring, and a leaf spring having its central part engaging the bolster and its ends bearing against the levers.

7. In a truck, the combination of a side frame and a bolster operatively related thereto, and means for supporting the bolster comprising coil springs seated on the frame adjacent the ends thereof, levers having their ends respectively fulcrumed on the frame and bearing on the coil springs, the bearing end of each lever being disposed above a coil spring and a work absorptive spring interposed between the bolster and levers, the springs and levers being related to each other so that the transmission of the load from the bolster to the frame is in a generally downward direction.

8. In a truck, the combination of a beam type side frame having guide columns adjacent the ends thereof, a bolster slidable between the columns, coil springs seated on the frame adjacent the ends thereof, levers having their ends respectively fulcrumed on the frame and bearing directly on the upper ends of the coil springs, the bearing end of each lever being disposed above a coil spring and a leaf spring interposed between the bolster and intermediate points on the levers.

9. In a truck, the combination of a beam type side frame having guide columns adjacent the ends thereof, a bolster slidable between the columns, coil springs seated on the frame adjacent the ends thereof, levers having their ends respectively fulcrumed on the frame and bearing directly on the upper ends of the coil springs, the bearing end of each lever being disposed above a coil spring and a leaf spring interposed between the bolster and intermediate points on the levers and positioned at a higher elevation than the coil springs.

10. In a truck, the combination of a beam type side frame having guide columns adjacent the ends thereof and spring pockets adjacent the columns, a bolster slidable between the columns, coil springs seated in the pockets, levers having their ends respectively fulcrumed on the frame and bearing directly on the upper ends of the coil springs, and a leaf spring interposed between the bolster and intermediate points on the levers.

11. In a truck, the combination of a beam type side frame having journal boxes, guide columns inwardly of the boxes and a spring pocket between an adjacent column and box, a bolster slidable between the columns, coil springs seated in the pockets, levers having their ends respectively fulcrumed on the frame and bearing directly on the upper ends of the coil springs, and a leaf spring interposed between the bolster and intermediate points on the levers.

12. In a truck, the combination of a beam type side frame having guide columns adjacent the ends thereof, a bolster slidable between the columns, spaced coil springs seated on the frame, levers having their inner ends fulcrumed on the frame and their outer ends bearing directly on the coil springs, respectively, and a leaf spring interposed between the bolster and intermediate points on the levers.

13. In a truck, the combination of a beam type side frame having journal boxes, guide columns inwardly of the boxes and a spring pocket between an adjacent column and box, a bolster slidable between the columns, coil springs seated in the pockets, levers having their inner ends fulcrumed on the frame and their outer ends bearing directly on the coil springs, respectively, and a leaf spring interposed between the bolster and intermediate points on the levers.

14. In a truck, the combination of a beam type side frame having journal boxes, guide columns inwardly of the boxes and a spring pocket between an adjacent column and box, a bolster slidable between the columns, coil springs seated in the pockets, levers having their inner ends fulcrumed on the frame and their outer ends directly on the coil springs, respectively, and a leaf spring having its central part engaging the bolster and its ends bearing against the levers.

15. In a truck, the combination of a beam type side frame having an intermediate depressed portion including compression and tension webs and guide columns, a bolster slidable between the columns, spaced coil springs seated on the tension web, levers having their ends respectively fulcrumed on the compression web and bearing on the upper ends of the coil springs, and a leaf spring interposed between the bolster and intermediate points on the levers.

16. In a truck, the combination of a beam type side frame having an intermediate depressed portion including a compression web and guide columns, a bolster slidable between the columns, spring pockets at the ends of the portion, coil springs seated in the pockets, levers having their ends respectively fulcrumed on the compression web and bearing on the upper ends of the coil springs, and a leaf spring interposed between the bolster and intermediate points on the levers.

17. In a truck, the combination of a beam type side frame having guide columns and an intermediate depressed portion including a compression web, a bolster slidable between the columns, spring pockets at the ends of the portion, the base of each pocket being lower than the compression web, coil springs seated in the pockets, levers having their ends respectively fulcrumed on the compression web and bearing on the upper ends of the coil springs, and a leaf spring interposed between the bolster and intermediate points on the levers.

18. In a truck, the combination of a beam type side frame having guide columns and an intermediate depressed portion of box section including compression and tension webs, a bolster slidable between the columns, spring pockets at the ends of the section, the base of each pocket being a continuation of the tension web, coil springs seated in the pockets, levers having their ends respectively fulcrumed on the compression web and bearing on the upper ends of the coil springs, and a leaf spring interposed between the bolster and intermediate points on the levers.

19. In a truck, the combination of a beam type side frame having guide columns and an intermediate depressed portion including compression and tension webs, a bolster slidable between the columns, spaced coil springs seated on the tension web, levers having their ends respectively fulcrumed on the compression web and bearing on the upper ends of the coil springs, and a leaf spring interposed between the bolster and intermediate points on the levers and positioned at a higher elevation than the coil springs.

20. In a truck, the combination of a beam type side frame having guide columns and an intermediate depressed portion including compression and tension webs, a bolster slidable between the columns, spaced coil springs seated on the tension web, levers having their inner ends fulcrumed on the compression web and their outer ends on the coil springs, respectively, and a leaf spring having its central part engaging the bolster and its ends bearing on the levers.

21. In a truck, the combination of a side frame having spaced spring pockets, a bolster operatively related to the frame, and means for supporting the bolster on the frame comprising coil springs seated in the pockets, a cap resting on the upper end of each coil spring, levers having their ends respectively fulcrumed on the frame and bearing on the caps, a leaf spring interposed between the bolster and intermediate points on the levers, and stop means limiting the downward movement of each cap to less than the maximum deflection of the associated coil spring to thereby prevent the coil springs from being driven solid.

22. In a truck, the combination of a beam type side frame having journal boxes, an intermediate depressed portion and guide columns at the ends of the portion, a bolster having an open bottom end including oppositely extending wings slidable between the columns, spaced coil springs seated on the portion, levers having their ends respectively fulcrumed on the portion and bearing on the upper ends of the coil springs, and a leaf spring having its central part engaging the bolster end and its ends bearing on the levers.

23. In a truck, the combination of a side frame having spaced spring pockets, a bolster operatively related to the frame, and means for supporting the bolster on the frame comprising coil springs seated in and extending above the side walls of the pockets, a cap resting on the upper end of each coil spring and being sized larger than the upper ends of the pockets, levers having their ends respectively fulcrumed on the frame and bearing on the caps, and a leaf spring interposed between the bolster and intermediate points of the levers, the downward movement of each cap being limited by the associated pocket side wall and less than the maximum deflection of the associated coil spring to thereby prevent the coil springs from being driven solid.

MARK H. MARTIN.